United States Patent [19]

Heidenreich et al.

[11] Patent Number: 4,679,205
[45] Date of Patent: Jul. 7, 1987

[54] TILTABLE METALLURGICAL FURNACE VESSEL

[75] Inventors: Peter Heidenreich, Mülheim; Karl-Heinz Heinen, Siegen; Wolfgang Müller, Siegen; Heinz Veuhoff, Siegen, all of Fed. Rep. of Germany

[73] Assignee: Fried. Krupp GmbH, Essen, Fed. Rep. of Germany

[21] Appl. No.: 717,161

[22] Filed: Mar. 27, 1985

[30] Foreign Application Priority Data

Mar. 31, 1984 [DE] Fed. Rep. of Germany ....... 3412077

[51] Int. Cl.$^4$ .............................................. F27D 3/14
[52] U.S. Cl. .................................... 373/84; 266/195; 266/240; 432/157; 432/160; 222/604
[58] Field of Search ...................... 373/83, 84; 266/44, 266/45, 161, 164, 171, 195, 196, 236, 240; 432/157, 160; 222/590, 604, 605

[56] References Cited

U.S. PATENT DOCUMENTS

| | | | |
|---|---|---|---|
| 2,880,989 | 4/1959 | Stauffer | 266/196 |
| 2,890,951 | 6/1959 | Roy | 266/196 X |
| 4,444,378 | 4/1982 | Reese | 266/240 |
| 4,523,747 | 6/1985 | Schnitzer et al. | 373/84 X |

FOREIGN PATENT DOCUMENTS

| | | |
|---|---|---|
| 969953 | 5/1950 | France . |
| 992676 | 7/1951 | France . |
| 1360793 | 7/1974 | United Kingdom . |

OTHER PUBLICATIONS

Rolf–Dieter Baare et al, "Schlackenfreier Abstich, ein Hauptproblem bei der Herstellung von Qualitätsstahl" Stahl und Eisen (Steel and Iron) 104 (1984) No. 1, pp. 7–10.

Primary Examiner—Roy N. Envall, Jr.
Attorney, Agent, or Firm—Spencer & Frank

[57] ABSTRACT

In a tiltable metallurgical furnace vessel having a completely closed lateral protrusion with a closable discharge opening on its underside, simplified furnace structure is achieved by configuring the protrusion as a removable, heatable fore-hearth that is constructed in the form of a casting spout. A particularly simple structure results due to the fact that the fore-hearth is flanged to the main furnace vessel and essentially has a box shape. The invention is particularly useful for electric arc furnaces.

27 Claims, 3 Drawing Figures

TILTABLE METALLURGICAL FURNACE VESSEL

BACKGROUND OF THE INVENTION

The present invention relates to a tiltable metallurgical furnace vessel, particularly a furnace vessel for an electric arc furnace, having a completely closed lateral protrusion that has an underside with a closable discharge opening.

The furnace vessel of an electric arc furnace as mentioned above is known from *Stahl und Eisen* 104 (1984) No. 1, pages 7-10. Compared to an electric arc furnace vessel having a lateral pouring spout, the above-mentioned furnace vessels have the advantage that they have a larger furnace volume and that the necessary tilt angle is reduced. However, they have the drawback that the center of gravity of the vessel lies substantially outside the tilt axis and thus additional tilting forces are required. Furthermore the vessel, due to the eccentric position of its center of gravity, must be statically adapted by the provision of special reinforcements.

SUMMARY OF THE INVENTION

It is an object of the present invention to provide a tiltable metallurgical furnace vessel of the abovementioned type which has an essentially circular cross section and nevertheless is discharged downwardly, but not through the bottom of the vessel and without substantial additional forces being required to tilt the vessel.

According to the present invention this object can be attained by providing a lateral protrusion that is removable from the furnace vessel, the protrusion being configured as a heatable fore-hearth which is constricted in the form of a pouring spout. The phrase "constricted in the form of a pouring spout" means that the side walls of the fore-hearth form a linear extension away from the opening in the side of the furnace vessel where the fore-hearth is connected. The term "fore-hearth" means an auxiliary chamber that so positioned that its bottom is flush with the bottom of the furnace vessel. The present invention results in the advantage that no special furnace construction is required, i.e., that the hearths can be manufactured or retrofitted to have a circular horizontal cross section and all associated devices can be used unmodified. Moreover, heating the fore-hearth reliably prevents "freezing," i.e. lowering of the temperature, of the melt to below the liquid point.

If an insertable burner is used to heat the fore-hearth, this burner can simultaneously be used to melt scrap or the like.

A particularly simple and advantageous configuration is realized by flanging the fore-hearth to the furnace vessel.

Simple and secure sealing of the discharge opening of the fore-hearth is realized by a laterally pivotal cover which cooperates with a slide guide arranged as an oblique plane with respect to the discharge opening, so that the slide guide acts as a cam to vary the vertical position of the cover as it is pivoted.

DESCRIPTION OF THE PREFERRED EMBODIMENT

Figure 1:
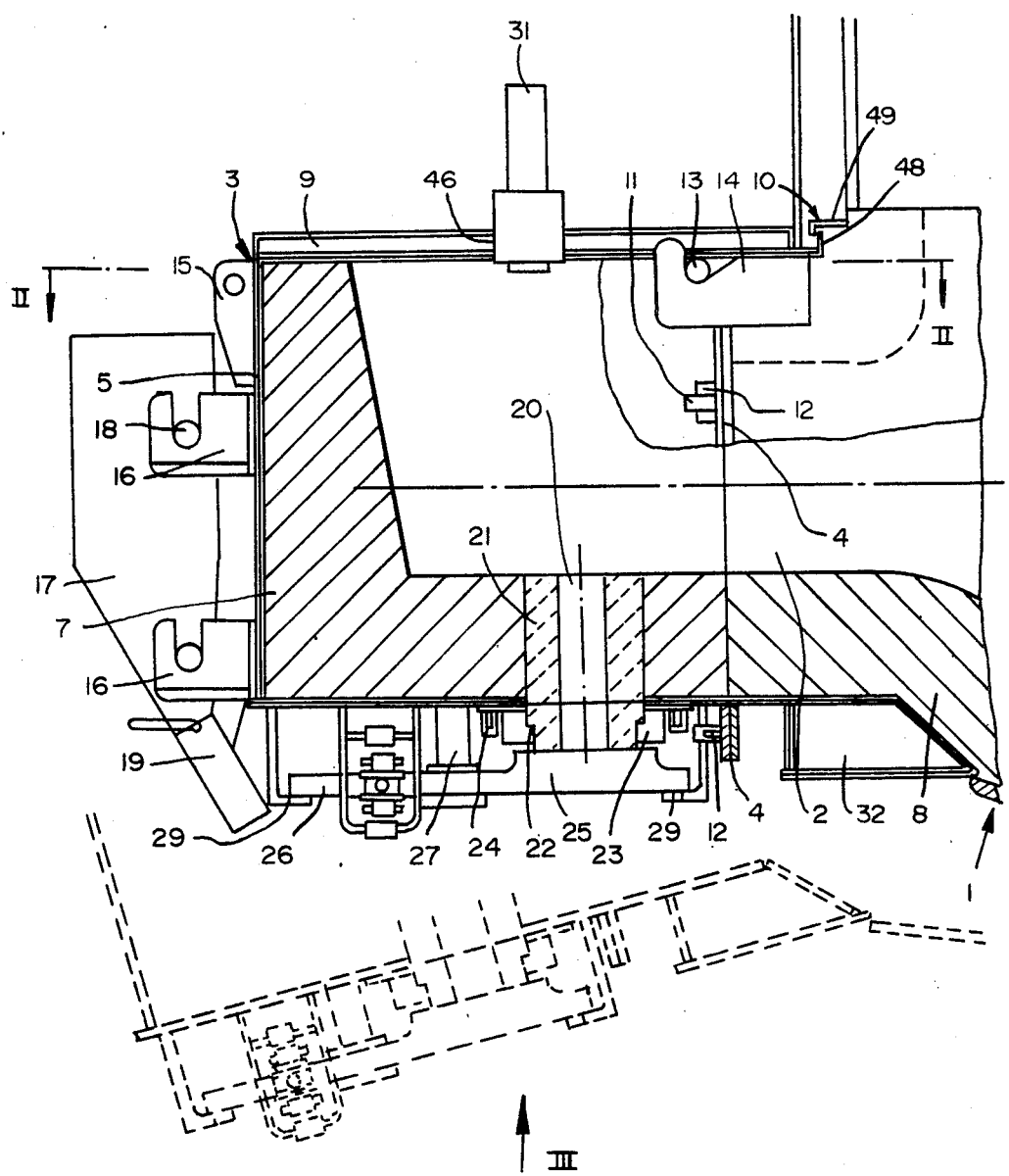
FIG. 1 is a vertical center sectional view of a portion of the metallurgical furnace vessel of the present invention, and illustrates a fore-hearth and part of the associated main furnace vessel to which the fore-hearth is attached.
Figure 2:
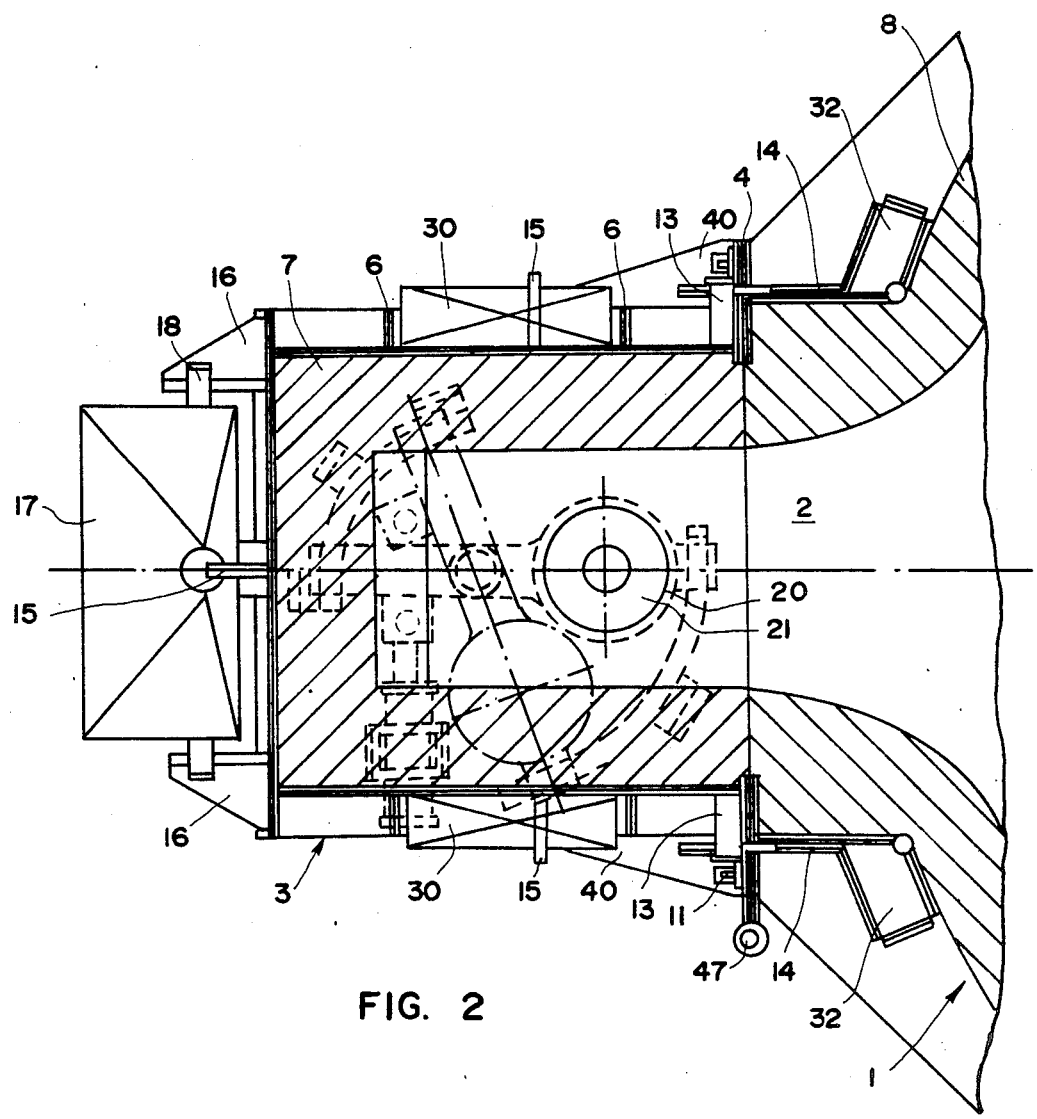
FIG. 2 is a sectional view along line II—II of FIG. 1.

As can be seen in FIGS. 1 and 2, the main furnace vessel 1 of an electric arc furnace has a side opening 2 having a rectangular cross section to which is connected a fore-hearth 3 by means of a flange connection 4, which will be described in more detail later. Fore-hearth 3 has an approximately block-shaped or box-shaped steel housing 5 which is provided with reinforcing ribs 40 on its exterior and with a lining 7 of refractory material in its interior, with lining 7 being flush with refractory lining 8 of furnace vessel 1. The open upper side of fore-hearth 3 is provided with a water-cooled cover 9 which, on the side of the furnace, can be pivoted and removed by way of a hook-in connection 10. The hook-in connection 10 for the cover 9 is constructed as a so-called cup seal which contains graphite as the sealing agent.

Figure 3:
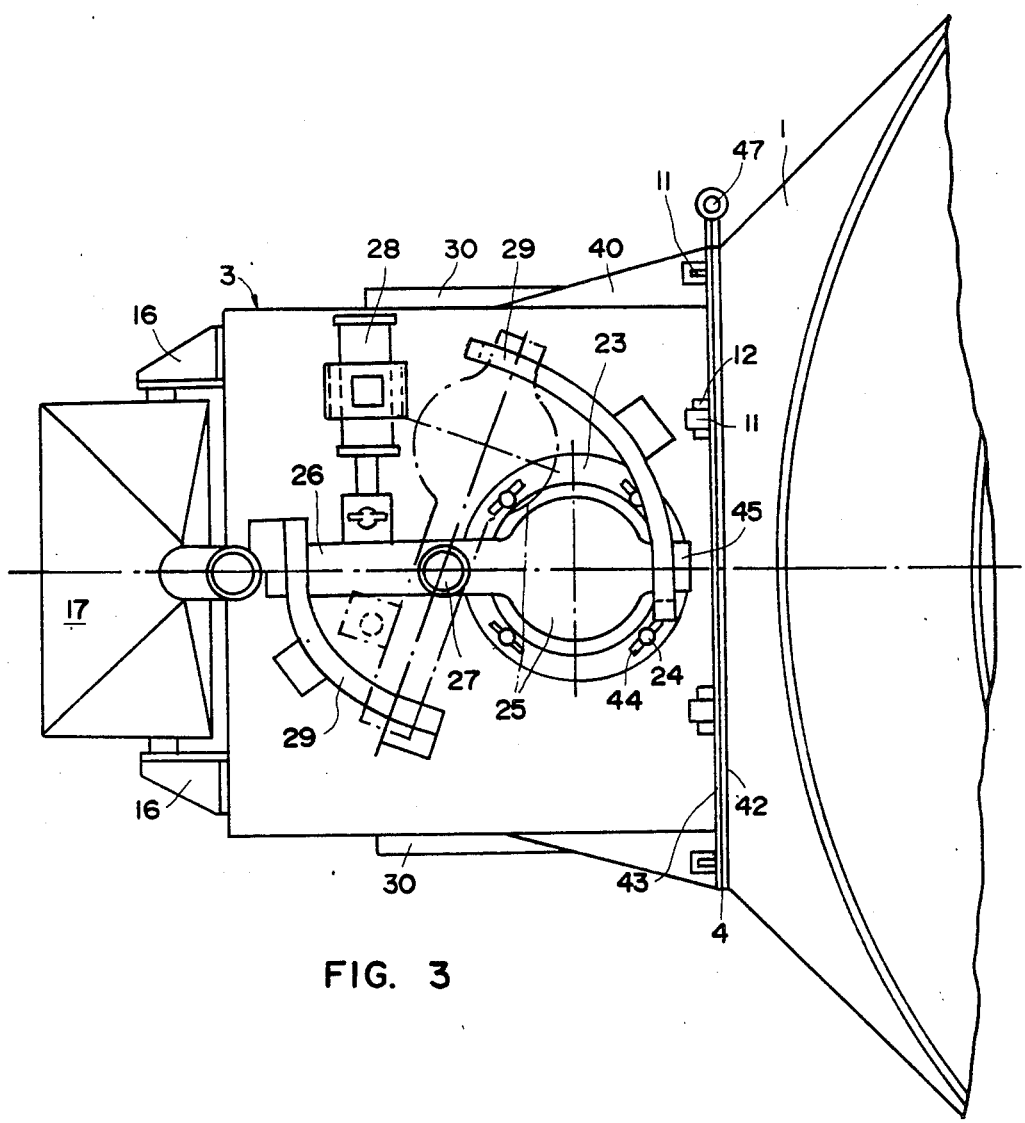
FIG. 3 is a view in the direction of arrow III of FIG. 1.

Flange connection 4 extends between furnace vessel 1 and fore-hearth 3 along the side walls and the underside of fore-hearth 3. Referring to FIG. 3, the flange 42 of furnace vessel 1 is provided with outwardly projecting bolts 11 having wedge-shaped recesses (not illustrated) therein. Bolts 11 extend through corresponding openings (not illustrated) in flange 43 of housing 5. To join housing to vessel 1, tightening wedges 12 are pushed through the recesses in bolts 11 to press the flange 43 of fore-hearth 3 against the flange 42 on the furnace side. To facilitate attachment and removal of fore-hearth 3, the latter is provided, at each of its two upper corners facing furnace vessel 1, with a laterally projecting bolt 13 (see FIG. 2) which can be mounted in an associated upwardly open hook 14 affixed to furnace vessel 1 so as to be pivotal about the axis of the two bolts 13. Eyes 15 disposed in the upper region of fore-hearth 3 serve to accommodate hooks (not illustrated) used during attachment and removal of fore-hearth 3. When removed, fore-hearth 3 can easily be cleaned or replaced by a new or repaired fore-hearth if it is worn. Because of its block shape, manufacture of the fore-hearth is extremely inexpensive. Later retrofitting of an existing furnace vessel is easily possible by simply adapting the area of the casting spout.

At the exterior of fore-hearth 3, where it faces away from furnace vessel 1, a feed funnel 17 is attached by way of bolts 18 which engage in four tongue-like bearings 16 provided there, bolts 18 being affixed to funnel 17 and bearings 16 being affixed to fore-hearth 3. At its underside, feed funnel 17 is provided with an extension pipe 19 oriented in the direction of furnace vessel 1 for supplying alloying additives into a pan (not shown) which serves to mix the additives with the metal flowing out of discharge opening 20 disposed at the underside of fore-hearth 3.

Discharge opening 20 is provided with a tubular insert 21 made of a ceramic material and provided, at its outwardly projecting underside, with a drawn-in collar 22 which is engaged by a corresponding water-cooled flange-like mount 23. Flange-like mount 23 is connected to the underside of fore-hearth 3 by means of a wedge-bolt connection, with bolts 24 extending from housing 5 through openings (not illustrated) in mount 23 and with wedges 44 being inserted through openings (not illustrated) in bolts 24 as is illustrated best in FIG. 3. To secure the discharge opening 20, which is closed by a plug (not illustrated) of a suitable, known material, a cover 25 is pressed against the discharge side. Cover 25 is provided a short arm 45 and with a horizontally extending lever 26 which is pivotally mounted to a pin 27 mounted on the underside of fore-hearth 3. The axis of pin 27 extends in the vertical direction. The pivoting movement of the cover 25 is effected by a doubleaction (that is, both extension and retraction are powered) hydraulic cylinder 28, which is mounted on the underside of fore-hearth 3 so as to be movable in space and which engages lever 26. Two arcuate slide guides 29, in the form of oblique planes fastened to the underside of forehearth 3, act as cams to guide lever 26 and arm 45 so that cover 25, when closed, is pressed against discharge opening 20. Furthermore, during the opening phase, cover 25 is simultaneously moved downwardly, i.e., as cover 25 rotates away from opening 20 it additionally undergoes a withdrawing movement. This configuration of the discharge opening seal has the advantage, in additon to forming a secure seal by firm pressure, that possible interference with the opening movement due to baked-on material and crusting can be prevented.

An induction coil 30 is disposed at the two facing parallel side walls of fore-hearth 3 so as to maintain the necessary discharge temperature of the molten metal and simultaneously blend it. A central opening 46 in water-cooled cover 9, covering fore-hearth 3, serves for the passage of an oil-oxygen burner 31, which is provided primarily to melt pieces of scrap. However, it may also be used to heat the melt in case coils 30 are malfunctioning. After removal of burner 31, the opening 46 in cover 9 is closed by means of a likewise water-cooled seal (not illustrated).

The maximum lowering movement of fore-hearth 3 together with main furnace vessel 1 is shown in FIG. 1 by the corresponding outline in dotted lines. However, for discharge, the furnace is tilted only to the extent that a small residue containing the slag remains in the furnace. The slag can then be discharged separately afterwards. Once the furnace is completely empty, the open discharge opening 20 is cleaned in a known manner by means of an oxygen lance. Then a new plug is introduced into ceramic insert 21 and the latter is thereafter sealed by means of cover 25. Furnace vessel 1 is then available to receive a new charge.

Due to the small mass constituted by fore-hearth 3 and its liquid metal fill, at most slight additional forces are required to tilt the furnace. Moreover, opening 2 of furnace vessel 1 is provided with a water-cooled, collar-type frame 32 which surrounds it. This frame 32 as well as cover 9 and flange-like mount 23 are connected jointly to a cooling system (not illustrated) which simultaneously serves to cool the side walls of the furnace vessel.

As shown in FIGS. 2 and 3, the flanges 42 and 43 of the flange connection 4 are each connected to hinge joints 47 which are so positioned that the fore-hearth 3, after removing the tightening wedges 12, can be pivoted about a perpendicular axis formed by said hinge joints. To obtain a close contact of the flanges 42 and 43 the hinge joints 47 are provided with a sufficient clearance.

The hook-in connection 10 is formed by an upwardly projecting fence 48 positioned at the end of the cover 9 adjacent to the furnace vessel 1, which cover 9 is surrounded by the downwardly projecting leg of an angle steel 49 affixed to furnace vessel 1.

It will be understood that the above description of the present invention is susceptible to various modifications, changes and adaptations, and the same are intended to be comprehended within the meaning and range of equivalents of the appended claims.

What we claim is:

1. In a tiltable metallurgical furnace vessel provided with a completely closed lateral protrusion having an underside with a closable discharge opening, the improvement wherein:
    said furnace vessel is provided with a flange;
    the protrusion is a removable, heatable fore-hearth which is constricted in the form of a casting spout, said forehearth having a flange and an essentially box shape;
    pivoting means is provided for pivotally disposing said fore-hearth on said furnace vessel; and
    fastening means is provided for fastening said flanges of said fore-hearth and said furnace together, said fastening means including bolts having openings therein and wedges inserted into said openings, said bolts being affixed to one of said flanges.

2. A furnace as defined in claim 1, wherein said furnace is an electric arc furnace.

3. A furnace vessel as defined in claim 1, wherein said fore-hearth comprises a wall with an opening therein, and a burner inserted through the opening to serve as a heating device.

4. A furnace vessel as defined in claim 2, wherein said fore-hearth further comprises first and second sides, and electrical, inductive heating elements disposed at said first and second sides of the fore-hearth to serve as an additional heating device.

5. A furnace vessel as defined in claim 1, wherein said fore-hearth comprises first and second sides, and electrical, inductive heating elements disposed at said first and second sides of the fore-hearth.

6. A furnace vessel as defined in claim 7, wherein said flange of said fore-hearth has an upper region, and wherein said pivoting means comprises means mounted in the upper region of said flange of said fore-hearth for providing a horizontal pivot axis, and means mounted on said furnace vessel for cooperating with said means for providing a horizontal pivot axis to pivotally attach said fore-hearth to said furnace vessel.

7. A furnace vessel as defined in claim 7, wherein said means for pivotally disposing said fore-hearth comprises pivoting means about a perpendicular axis.

8. A furnace vessel as defined in claim 1, wherein said fore-hearth comprises a water-cooled cover.

9. A furnace vessel as defined in claim 8, further comprising means tiltably securing said cover to said fore-hearth.

10. A furnace vessel as defined in claim 1, further comprising a cover for said discharge opening, and means attached to said fore-hearth for mounting said cover for laterally pivotal movement.

11. A furnace vessel as defined in claim 10, wherein said discharge opening is disposed in a plane and wherein said means attached to said fore-hearth for mounting said cover comprises a slide guide having a surface-disposed in an oblique plane with respect to said discharge opening.

12. A tiltable metallurgical furnace, comprising:
    a main furnace vessel having a side with a furnace opening therein;

a generally box-shaped housing a cavity therein, having side walls with upper portions, and having a bottom with a discharge opening;

mounting means for removably mounting said housing to said main furnace vessel with said cavity in fluid communication with said furnace opening, said mounting means including a pair of support elements attached to said main furnace vessel adjacent said furnace opening, means affixed to the upper portions of said side walls for walls for detachably and pivotably supporting said housing from said support elements, a first flange mounted on said main furnace vessel and extending at least partially around said furnace opening, said first flange including a horizontal bottom portion and a pair of vertical side portions, one side portion of said first flange being disposed at either end of said bottom portion of said first flange, a second flange mounted on said housing, said second flange including a bottom portion configured for engagement with said bottom portion of said first flange and having a pair of side portions configured for engagement with said side portions of said first flange, said bottom and side portions of said second flange having openings therein, and joining means for temporarily joining said first and second flanges, said joining means including a plurality of bolts that have openings therein, at least one bolt being affixed respectively to each of said bottom and side portions of said first flange and extending through a respective opening in said second flange, and a plurality of wedge elements, each wedge element extending through an opening in a respective bolt;

closure means mounted on said housing for selectively closing said discharge opening; and heating means mounted on said housing for heating the contents of said cavity.

13. A furnace as defined in claim 12, wherein said closure means comprises a closure element mounted for rotation about an axis that extends through said housing, and cam means cooperating with said closure element for varying the vertical distance between said closure element and said discharge opening as said closure element is rotated.

14. In a tiltable metallurgical furnace vessel provided with a completely closed lateral protrusion having an underside with a closable discharge opening, the improvement wherein:

the protrusion is a removable, heatable fore-hearth which is constricted in the form of a casting spout;

a cover is provided for said discharge opening; and means is provided for mounting said cover for laterally pivotal movement, said means being attached to said fore-hearth.

15. A furnace as defined in claim 14, wherein said furnace is an electric arc furnace.

16. A furnace vessel as defined in claim 14, wherein said fore-hearth comprises a wall with an opening therein, and a burner inserted through the opening to serve as a heating device.

17. A furnace vessel as defined in claim 16, wherein said fore-hearth further comprises first and second sides, and electrical, inductive heating elements disposed at said first and second sides of the fore-hearth to serve as an additonal heating device.

18. A furnace vessel as defined in claim 14, wherein said fore-hearth comprises first and second sides, and electrical, inductive heating elements disposed at said first and second sides of the fore-hearth.

19. A furnace vessel as defined in claim 14, wherein said furnace vessel comprises a flange and said fore-hearth comprises a flange, and further comprising means for fastening said flanges together.

20. A furnace vessel as defined in claim 19, wherein said means comprises bolts having openings therein and wedges inserted into said openings, said bolts being affixed to one of said flanges.

21. A furnace vessel as defined in claim 19, further comprising means for pivotally disposing said fore-hearth on said furnace vessel.

22. A furnace vessel as defined in claim 21, wherein said flange of said fore-hearth has an upper region, and wherein said means for pivotally disposing said fore-hearth comprises means mounted in the upper region of said flange of said fore-hearth for providing a horizontal pivot axis, and means mounted on said furnace vessel for cooperating with said means for providing a horizontal pivot axis to pivotally attach said fore-hearth to said furnace vessel.

23. A furnace vessel as defined in claim 21, wherein said means for pivotally disposing said fore-hearth comprises means for pivoting said fore-hearth about a perpendicular axis.

24. A furnace vessel as defined in claim 14, wherein said fore-hearth has essentially a box shape.

25. A furnace vessel as defined in claim 14, wherein said fore-hearth comprises a water-cooled cover.

26. A furnace vessel as defined in claim 25, further comprising means tiltably securing said cover to said fore-hearth.

27. A furnace vessel as defined in claim 14, wherein said discharge opening is disposed in a plane and wherein said means for mounting said cover comprises a slide guide having a surface disposed in an oblique plane with respect to said discharge opening.

* * * * *